United States Patent Office 3,342,879
Patented Sept. 19, 1967

3,342,879
DEHYDRATION PROCESS USING MOLYBDENUM SULFIDE
Lloyd Albert Pine, Baton Rouge, La., assignor to Esso Research and Engineering Company, a corporation of Delaware
No Drawing. Filed July 3, 1963, Ser. No. 292,736
4 Claims. (Cl. 260—643)

The present invention relates to a process for dehydration. More particularly this invention relates to carrying out said dehydration in the presence of a preferred catalyst at temperatures in the range of 400 to 600° F. In a preferred embodiment, this invention relates to selective dehydration of secondary alcohols to olefins in the presence of primary alcohols utilizing a molybdenum sulfide catalyst.

It has now been discovered that molybdenum sulfide either in bulk or on a high surface area support is a potent dehydration catalyst. This discovery is applicable to the production of a wide variety of products by a simple, essentially single step process.

Particularly attractive feed stocks to the dehydration reaction are $C_2$ to $C_{20}$, preferably $C_6$ to $C_{12}$ amides which may be dehydrated to form the corresponding nitriles. Equally amenable to the dehydration reaction are $C_3$ to $C_{20}$, preferably $C_6$ to $C_{16}$, ethers which may be dehydrated to form the corresponding olefins. Still another feed stock which may be dehydrated by the catalysts of the instant invention are $C_3$ to $C_{30}$, preferably $C_4$ to $C_{24}$, alcohols which are converted to their corresponding olefins.

The molybdenum sulfide catalyst of this invention may, of course, be supported on inert carriers of any of the readily available types. Thus, examples of carrier materials which may be used as solid support components of the catalysts are the various aluminous and silicious materials of natural or synthetic origin such as bauxite, aluminum oxide, activated alumina, kieselguhr, magnesium oxide, magnesium silicate, magnesium carbonate, barium sulphate, pumice, kaolin, activated carbon, clays, Carborundum, Alundum, and the like. These catalysts preferably contain 5–25 wt. percent of the active material supported on a carrier of the type above described, e.g. activated carbon.

Reaction conditions for the present process are as follows: Temperature, 400–600° F., preferably 450–550° F., e.g. 500° F.; Holding times, 1–15 hours, preferably 1–12 hours, e.g. 3 hours. The amount of the catalyst utilized is 1–60 volume percent, preferably 5–40 volume percent, e.g. 20 volume percent, preferably of the supported catalyst, based on the total feed supplied. The reaction pressure is not a critical feature of this invention and ordinarily the dehydration is carried out under the vapor pressure of the feed and in the absence of any externally applied pressure.

In a preferred embodiment it has now been surprisingly discovered that secondary alcohols may be selectively dehydrated in the presence of primary alcohols to form olefins, without any substantial losses of primary alcohols, by utilizing a molybdenum sulfide catalyst. A preferred molybdenum sulfide catalyst has the following general composition: 5–15 wt. percent, preferably 8–10 wt. percent, e.g. 9 wt. percent, molybdenum oxide on a carrier of the type previously described, preferably activated carbon, sulfided to saturation with $H_2S$. This process is particularly attractive for use in any process wherein mixtures of synthetic alcohols are produced, e.g. telomerization. In this latter process the product comprises a mixture of primary and secondary alcohols which vary in chain length from a few carbon atoms to 25 carbon atoms, together with smaller amounts of hydrocarbons. The more valuable products are of course the primary alcohols. Since the separation of primary from secondary alcohols by distillation, solvent extraction or other known means is extremely difficult because of the overlapping of boiling points and solubilities of the components of the telomer product, the selective dehydration process is particularly advantageous.

The alcohols which may be dehydrated according to the selective process are mixtuers of $C_1$–$C_{30}$ primary and $C_3$–$C_{30}$ secondary saturated monoalcohols. These alcohols include both straight and branched chain alcohols and additionally include cylic alcohols. Examples of these alcohols are methanol, ethanol, normal propanol, isopropanol, normal butanol, isobutanol, the appropriate pentanols, heptanols, hexanols, octanols, nonanols, decanols, hendecanols, dodecanols, tridecanols, eicosonols, etc. Examples of the cyclic saturated alcohols are cyclopentanol, cyclohexanol, cycloheptanol, cyclooctanol, cycloeicosonol, etc. The invention may be applied to treat specific alcohols of these classes or mixtures of these alcohols. Since somewhat different conditions are used depending upon the molecular weight of the alcohols to be dehydrated, higher selectivities in the dehydration of secondary alcohols from primary alcohols are obtained where the primary and secondary alcohols are of similar molecular weight. In addition, the dehydration may be applied to glycols containing mixtures of primary and secondary alcohol groups on a single molecule. The dehydration of this type of glycol feed stock results in the production of unsaturated primary alcohols. Generally the primary and secondary alcohol group of the glycol should be separated by four or more carbon atoms if the desired degree of selectivity is to be achieved.

Where tertiary alcohols are present with the primary and secondary alcohols, these alcohols will also be dehydrated by the present process. Thus, the tertiary alcohols will be dehydrated to olefins and can thus be easily removed from the desired alcohols, i.e. the primary alcohols, with the other olefins formed. These tertiary alcohols again may be $C_4$–$C_{30}$ branched chain saturated monoalcohols corresponding to those described above.

As previously mentioned, particularly attractive feed stocks for the dehydration process are the telomer alcohol products obtained by telomerizing methanol with a $C_2$–$C_5$ olefin, preferably ethylene, in the presence of a free radical initiator. Processes for preparing these alcohols are described, for example, in U.S. 2,668,181. Additionally, other methods for preparing telomer alcohol may be utilized to prepare an alcohol feed stock for the present process. Typical compositions of telomer product alcohols may be $C_3$–$C_{25}$ alcohols, containing 15–50 weight percent, e.g. 25 weight percent secondary alcohols, 1–5 wt. percent, e.g. 2 wt. percent tertiary alcohols, 10–25 wt. percent, e.g. 15 wt. percent hydrocarbon.

The invention will be further pointed out by reference to the following illustrative examples.

Example 1

61.4 grams of benzamide and 50 ml. of an approximately 10 wt. percent molybdenum sulfide on activated carbon catalyst were heated in a round bottom flask at a temperature in the range of 446–473° F. for a period of four hours. The reaction product was analyzed as follows using gas chromatography:

| | Percent |
|---|---|
| Benzamide | 71.0 |
| Benzoic acid | 12.9 |
| Benzonitrile | 16.1 |

Example 2

Normal butyl ether was fed to an autoclave containing 60 vol. percent of an approximately 10 wt. percent molybdenum sulfide on activated carbon catalyst. The reaction vessel was maintained at 600° F. for a period of 6 hours. Analysis of the reaction product indicated that 3.54 wt. percent of the ether had been converted to butylene.

*Example 3*

Cyclohexanol was admitted to a stirred autoclave maintained at 480° F. and containing 50 vol. percent, based on alcohol feed, of an approximately 10 wt. percent molybdenum sulfide on activated carbon catalyst. Samples were taken at intervals and analyzed by gas chromatography. The results are tabulated below:

| Time on Condition, Hrs.: | Percent Cyclohexanol | Percent Cyclohexene |
|---|---|---|
| 0.5 | 72 | 28 |
| 1.5 | 56 | 44 |
| 2.5 | 44 | 56 |
| 3.5 | 40 | 60 |
| 4.5 | 28 | 72 |

*Example 4*

An 80:20 mixture of 1- and 2-octanol respectively was fed to an autoclave maintained at a temperature of 500° F. and containing 50 vol. percent, based on total octanol feed, of an approximately 10 wt. percent molybdenum sulfide on activated carbon catalyst and maintained under these conditions for a period of 3 hours. Analysis of the dehydrated product indicated that all of the secondary alcohol had been converted to octene while only 5.6% of the octanol-1 had been similarly degraded.

*Example 5*

400 ml. of an alcohol mixture obtained from the hydrogenation of dodecene 1,2 epoxide was charged to a stirred autoclave containing 200 ml. of an approximately 10 wt. percent molybdenum sulfide on activated carbon catalyst. The autoclave was maintained at 475–516° F. for 2 hours. The feed and product analysis obtained by gas chromatography are given below.

| | Feed, Percent | Product, Percent |
|---|---|---|
| $C_{12}$ epoxide | 1.8 | 0.9 |
| Paraffins and olefins | 18.1 | 37.2 |
| 1-dodecanol | 66.3 | 55.7 |
| 2-dodecanol | 11.4 | 1.8 |
| Unknown | 2.4 | 4.4 |

Having thus described the general nature and specific embodiments of the invention the true scope is now pointed out by the appended claims.

What is claimed is:

1. A process for selectively dehydrating a mixture consisting of alcohols containing both primary and secondary hydroxy groups selected from the group consisting of unsubstituted saturated aliphatic alcohols and unsubstituted saturated cycloaliphatic alcohols which comprises contacting said mixture with a molybdenum sulfide catalyst at a temperature in the range of 400 to 600° F. for a time sufficient to recover a mixture of products consisting essentially of primary alcohols and olefins.

2. The process of claim 1 wherein the catalyst is a 5–15 wt. percent molybdenum oxide on an inert support sulfided to saturation with $H_2S$.

3. The process of claim 2 in which the catalyst is supported on activated carbon.

4. The process of claim 1 wherein said mixture of oxygenated organic compounds consists of a mixture of alcohols obtained from the telomerization of methanol with ethylene and contains 15–50 wt. percent of secondary alcohols, 1–5 wt. percent of tertiary alcohols, 10–25 wt. percent hydrocarbons, the remainder being primary alcohols.

References Cited

UNITED STATES PATENTS

| | | | |
|---|---|---|---|
| 2,086,713 | 7/1937 | Grun | 260—642 |
| 2,162,913 | 6/1939 | Eversole et al. | 260—641 |
| 2,220,430 | 11/1940 | Stanley | 260—682 |
| 2,519,061 | 8/1950 | Mason | 260—682 |
| 2,694,049 | 11/1954 | Reynolds et al. | 260—641 |
| 2,797,247 | 6/1957 | Keith | 260—641 |
| 2,868,858 | 1/1959 | Capitani et al. | 260—638 |
| 3,129,253 | 4/1964 | Odioso et al. | 260—439 |
| 3,203,998 | 8/1965 | House et al. | |

FOREIGN PATENTS

| | | |
|---|---|---|
| 66,688 | 8/1957 | France. |
| 1,047,573 | 8/1957 | France. |
| 538,353 | 7/1941 | Great Britain. |
| 734,431 | 8/1955 | Great Britain. |

OTHER REFERENCES

Berkman et al.: "Catalysis," 1940, page 549.
Morrison et al.: "Org. Chem.," 1959, pp. 119, 335, 337.

LEON ZITVER, *Primary Examiner.*

J. E. EVANS, *Assistant Examiner.*